(12) United States Patent
Didwiszus et al.

(10) Patent No.: US 10,094,475 B2
(45) Date of Patent: Oct. 9, 2018

(54) PISTON FOR A COMPRESSED AIR CONTROL VALVE

(71) Applicant: WABCO GmbH, Hannover (DE)

(72) Inventors: Lars Didwiszus, Hannover (DE); Bernd-Joachim Kiel, Wunstorf (DE); Thomas Muller, Hannover (DE); Manuel Nave, Giesen (DE)

(73) Assignee: WABCO GmbH, Hannover (DE)

( * ) Notice: Subject to any disclaimer, the term of this patent is extended or adjusted under 35 U.S.C. 154(b) by 316 days.

(21) Appl. No.: 14/777,807

(22) PCT Filed: Feb. 14, 2014

(86) PCT No.: PCT/EP2014/000410
§ 371 (c)(1),
(2) Date: Sep. 17, 2015

(87) PCT Pub. No.: WO2014/161622
PCT Pub. Date: Oct. 9, 2014

(65) Prior Publication Data
US 2016/0281855 A1  Sep. 29, 2016

(30) Foreign Application Priority Data
Mar. 30, 2013  (DE) .................. 10 2013 005 711

(51) Int. Cl.
*F16J 15/3204* (2016.01)
*F16J 15/3224* (2016.01)
(Continued)

(52) U.S. Cl.
CPC ......... *F16J 15/3268* (2013.01); *F16J 15/164* (2013.01); *F16J 15/3204* (2013.01); *F16J 15/3224* (2013.01); *F16J 15/56* (2013.01)

(58) Field of Classification Search
CPC .... F16J 15/164; F16J 15/3204; F16J 15/3224; F16J 15/3268; F16J 15/56
See application file for complete search history.

(56) References Cited

U.S. PATENT DOCUMENTS 1,523,572 A * 1/1925 Palmer ...................... F16J 9/08
                                                       92/182
1,710,011 A * 4/1929 Burnett .................... F16J 1/005
                                                       92/182
(Continued)

FOREIGN PATENT DOCUMENTS

DE     29 47 895 B1    6/1981
DE     195 10 492 A1   9/1996
(Continued)

*Primary Examiner* — Logan Kraft
(74) *Attorney, Agent, or Firm* — Leydig, Voit & Mayer, Ltd.

(57) ABSTRACT

A piston, e.g., for a control valve in a vehicle compressed air system, is housed in a cylinder in an axially displaceable manner along a longitudinal center axis separating a first cylinder chamber and a second cylinder chamber. The piston has a peripheral annular groove of approximately rectangular cross-sectional in which a sealing ring is inserted, the free end of which is disposed on the inner cover surface of the cylinder. The sealing ring defines, together with at least one groove wall, at least one pressure support chamber. The piston also comprises, in the region of the annular groove, at least one axial opening, which joins the at least one pressure support chamber to the associated first or second cylinder chamber. A pneumatic or hydraulic connection independent of any geometric deformations of the sealing ring is enabled between at least one cylinder chamber and the associated pressure support chamber.

21 Claims, 4 Drawing Sheets

(51) Int. Cl.
*F16J 15/3268* (2016.01)
*F16J 15/56* (2006.01)
*F16J 15/16* (2006.01)

(56) References Cited

U.S. PATENT DOCUMENTS

| | | | | |
|---|---|---|---|---|
| 2,914,368 A | * | 11/1959 | Farmer | F16J 15/56 |
| | | | | 188/106 R |
| 3,224,378 A | | 12/1965 | Graham | |
| 3,626,812 A | * | 12/1971 | Trick | F15B 15/224 |
| | | | | 137/324 |
| 5,083,536 A | * | 1/1992 | Ariga | F16J 1/09 |
| | | | | 123/193.6 |
| 7,735,516 B2 | * | 6/2010 | Morris | B60G 17/0523 |
| | | | | 137/596.1 |
| 8,141,881 B2 | * | 3/2012 | Keck | F16J 15/164 |
| | | | | 277/438 |

FOREIGN PATENT DOCUMENTS

| | | |
|---|---|---|
| DE | 296 10 628 U1 | 11/1997 |
| DE | 196 52 179 A1 | 6/1998 |
| DE | 102 45 916 A1 | 4/2004 |
| DE | 10 2006 017 503 A1 | 10/2007 |
| DE | 10 2009 029 968 A1 | 12/2010 |
| DE | 10 2009 040 759 A1 | 3/2011 |
| EP | 0 142 938 A2 | 8/1985 |
| JP | 63308273 A | 12/1985 |

* cited by examiner (Stand der Technik)

PISTON FOR A COMPRESSED AIR CONTROL VALVE

FIELD OF THE INVENTION

The present invention generally relates to a piston, for example for a control valve in a compressed air system of a vehicle.

BACKGROUND OF THE INVENTION

The state of the art discloses a wide variety of pressurized-support sealing elements, such as so-called "Airzet" sealing rings (Airzet PR and Airzet PK), available from Freudenberg Simrit GmbH & Co. KG and elsewhere, for example, groove rings or the like for sealing a piston against a cylinder enclosing it. Thus, DE 296 10 628 U1, for example, discloses a sealing arrangement having an elastic sealing ring, which comprises a retaining part and a sealing part together with an approximately Z-shaped connecting part situated between these two parts. The end faces of the sealing part are formed by projecting strips, between which there are passage cross sections in order to allow the media on both sides of the sealing ring access to the grooves of the Z-shaped connecting part, thereby ensuring the pressurized support effect. For sealing a piston against a cylinder, this sealing arrangement is inserted into a circumferential piston groove. One disadvantage of this sealing arrangement is that, in the event of a deformation of the sealing ring during operation, for example, especially in the case of a radial compression of the latter, the passage cross sections of the apertures situated between the strips may be at least partially closed, so that the full pressurized-support seating effect no longer prevails, which can occur particularly in pistons that are used for control valves of vehicle compressed air systems. Such control valves are disclosed, for example, in DE 10 2009 040 759 A1, DE 10 2009 029 968 A1, DE 195 10 492 A1, DE 10 2006 017 503 A1, or DE 102 45 916 A1.

SUMMARY OF THE INVENTION

Generally speaking, it is an object of the present invention to provide a piston that, through pressurized-support scaling of simple design, allows two cylinder chambers to be sealed off from one another.

In known pistons, these are sealed in relation to the inner circumferential surface of an assigned cylinder by means of a pressurized-support sealing ring, in which the pressurized-support occurs with the aid of openings formed on the sealing ring, through which the media on both sides of the sealing ring have access to pressurized-support chambers on the scaling ring primarily from a radial direction. Access to such pressurized-support chambers irrespective of such a sealing ring can be created by forming relevant apertures in the piston, which connect each of the assigned cylinder chambers to the respective pressurized-support chambers, irrespective of any deformations of the sealing ring.

The present invention accordingly relates to embodiments of a piston, for example for a control valve in a compressed air system of a vehicle, which can be accommodated in a cylinder so that it is axially displaceable along a longitudinal center axis, such that it separates a first cylinder chamber and a second cylinder chamber from one another. The piston has a circumferential annular groove having an approximately rectangular cross sectional geometry, in which it is possible to insert a sealing ring, which can be applied with its free end to the inner circumferential surface of the cylinder and which, after insertion into the annular groove of the piston, together with at least one groove wall, defines at least one pressurized-support chamber. In the area of its annular groove, the piston comprises at least one axial aperture, which connects at least one pressurized-support chamber to the assigned first or second cylinder chamber.

This affords a reliable connection between the (preferably two) pressurized-support chambers and the two cylinder chambers, and, at the same time, a piston of simple design. This connection serves to allow the passage of a fluid and is advantageously maintained irrespective of any geometrical deformation of the sealing ring that might occur, for example in the event of accidental crushing or compression of the ring inside the annular groove of the piston.

In the context of this description, fluid is taken to mean any gas or a liquid. The piston is preferably used in a pneumatically operated control valve and may have the function of a relay piston.

Although a piston according to embodiments of the present invention may be equipped with a sealing ring, which together with the groove walls of the annular groove of the piston forms just one pressurized-support chamber, and in which this single, annularly circumferential pressurized-support chamber is connected to its assigned pressure chamber by at least one axial aperture in the groove wall, it is preferable to use a sealing ring-piston combination having two pressurized-support chambers.

According to an embodiment of the present invention, therefore, the piston, in the area of its annular groove in each of its two groove walls, comprises at least one axial aperture, which connects to pressurized-support chambers to the first or second cylinder chamber respectively assigned to them. The two pressurized-support chambers are formed by the sealing ring and by each of the groove walls respectively assigned to the sealing ring.

In another embodiment, the first groove wall and the second groove wall each have at least three apertures, which are arranged along the annular groove, circumferentially spaced at uniform intervals from one another. In this way, it is possible to achieve uniform and reliable ventilation of the pressurized-support chambers on the sealing ring by means of the fluid.

The axial apertures in the first groove wall and in the second groove wall may also, in each case, be arranged circumferentially and radially one above the other. This allows a significant simplification of the production process, since the apertures in the two grooved walls arranged parallel one above the other can be produced in one operation and also by means of one and the same tool.

With regards to the actual formation of the apertures in the groove walls, according to a first embodiment these may be formed as slit-shaped cutouts running radially and each having an approximately rectangular cross sectional geometry. The apertures in each of the groove walls thereby have an especially large flow cross section for delivering the fluid into the pressurized-support chambers.

In this context, the cutouts in the first groove wall each preferably run from their radial outer edge radially inwards at least into the area of the first pressurized-support chamber situated below. Despite a minimal structural weakening of the associated groove wall of the piston, this affords an especially effective delivery of the fluid from the first cylinder chamber into the assigned first pressurized-support chamber of the sealing ring.

The cutouts in the second groove wall may likewise each run from their radial outer edge radially inwards at least into the area of the second pressurized-support chamber situated above. This results in fluid dynamics affording an effective delivery of the fluid from the second cylinder chamber into the second pressurized-support chamber largely irrespective of deformations of the sealing ring, while at the same time minimizing the weakening of the mechanical structure of the piston.

In order to maximize the utilizable flow cross section, at least one of the cutouts in the first groove wall and/or in the second groove wall in each case may extend from their radial outer edge radially inwards to the groove base.

In a further embodiment, radially inner end portions of the slit-shaped cutouts each have a rounding. This serves to prevent the generation of mechanical notch stresses and the associated risk of cracking inside the piston.

According to another embodiment the apertures are formed as axially parallel straight bores in at least one groove wall; these bores are each arranged in the radial area of at least one pressurized-support chamber, and the bores are each introduced perpendicularly to the normal to the surface in the groove wall assigned to the pressurized-support chamber. This minimizes the mechanical weakening of the piston compared to the slit-shaped cutouts and reduces the manufacturing cost of producing the apertures on the piston groove.

Although the axial apertures in the groove walls, which are formed by slit-shaped and radially running cutouts or axially parallel bores, carry a very slight risk of blockage, the piston, in addition to these axial apertures, may have at least one radial channel in at least one groove wall, which also has a flow connection to an assigned pressure chamber. In a further embodiment, therefore, the piston, in the area of its annular groove in a groove wall, may have at least one axial aperture, which connects a first pressurized-support chamber to a first cylinder chamber, and at least one radial channel, which connects the second pressurized-support chamber to the second cylinder chamber, may be formed in the other groove wall on the sealing ring side. Although this design is less than ideal, with cleaner fluids and qualitatively high-grade, abrasion-resistant sealing ring material it can be used successfully and highly economically, since the formation of such a radial channel is much more cost-effective than producing the axial apertures in the groove walls.

The sealing ring is advantageously formed from an elastomer affording high elasticity and great abrasion resistance. This results in efficient mutual sealing of the cylinder chambers while, at the same time, affording great resistance to wear. For example, a hydrogenated acrylonitrile/butadiene rubber (HNBR) may be used, resulting in an excellent sealing effect at the same time as providing a long service life of the pressurized-support sealing between the piston and the cylinder. It is also possible, particularly where a metal piston is used, to produce the axial and radial ventilation apertures by machining.

In a preferred embodiment of the present invention, the piston is embodied as a control piston of a control valve of a compressed air system of a vehicle.

This embodiment may be further enhanced in that the control valve comprises at least one relay valve having a control piston.

Finally, the control valve may additionally be embodied as an axle modulator, which comprises at least one relay valve, preferably two relay valves, each having a control piston.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention is described in more detail below with reference to the accompanying drawing figures, in which.

Figure 1:
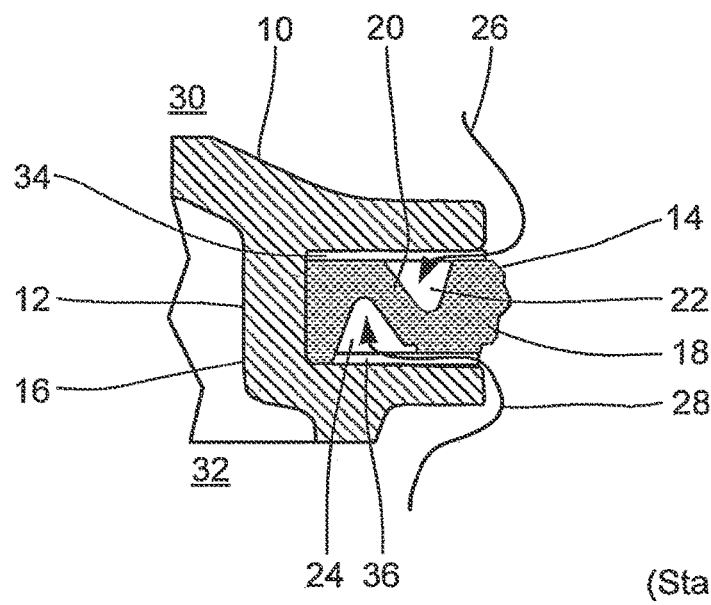
FIG. 1 shows a partial cross section through a conventional piston having a pressurized-support sealing ring.

LIST OF REFERENCE CHARACTERS 10 conventional piston
12 annular groove
14 sealing ring ("Airzet" sealing ring)
16 retaining portion on the sealing ring 14
18 sealing portion on the sealing ring 14
20 intermediate portion on the sealing ring 14
22 first pressurized-support chamber on the sealing ring 14
24 second pressurized-support chamber on the sealing ring 14
26 arrow, fluid flow
28 arrow, fluid flow
30 first cylinder chamber
32 second cylinder chamber
34 first strip on the sealing ring 14
36 second strip on the sealing ring 14
38 bore, aperture in the first groove wall
39 bore, aperture in the second groove wall
40 piston (for example, relay piston)
42 annular groove
44 first groove wall
46 second groove wall
48 groove base
50 sealing ring
51 sealing ring
52 first pressurized-support chamber
54 second pressurized-support chamber
56 retaining portion on the sealing ring 50
58 sealing portion on the sealing ring 50
60 seal projection on the sealing ring 50
62 intermediate portion on the sealing ring 50
64 first cylinder chamber
66 second cylinder chamber
68 longitudinal center axis
70 cutout, aperture in groove wall 44
72 cutout, aperture in groove wall 46
74 end portion of the cutout 70
76 end portion of the cutout 76
78 rounding of the cutout 70
80 rounding of the cutout 72

82 length of the cutout 70
84 length of the cutout 72
86 outer edge of the first groove wall
88 outer edge of the first groove wall
89 channel
90 inner circumferential surface of the cylinder
92 cylinder
94 material thickness of the first groove wall
96 material thickness the second groove wall
98 arrow, fluid flow
100 arrow, fluid flow
102 groove depth
104 piston diameter in the annular groove area
106 piston height in the annular groove area
110 control valve
111 axle modulator
112 solenoid valve
113 solenoid valve
114 solenoid valve
115 solenoid valve
116 brake pressure sensor
117 brake pressure sensor
118 relay valve
119 relay valve
120 control piston
121 control piston
122 control electronics
123 piston head
124 piston head
125 plate valve
126 plate valve

DETAILED DESCRIPTION OF THE
PREFERRED EMBODIMENTS

FIG. 1 shows a simplified partial cross section through a known embodiment of a piston 10 having a pressurized-support sealing ring 14. The piston 10 has a circumferential annular groove 12 with a rectangular cross sectional geometry, into which a sealing ring 14 with bilateral pressurized support is inserted. The sealing ring 14 here is designed, merely by way of example, as a so-called Airzet sealing ring having a Z-shaped cross sectional geometry. Any other embodiment of a pressurized-support sealing element may be used instead of this Airzet sealing ring.

The sealing ring 14 comprises a retaining portion 16 bearing against the groove base, together with a sealing portion 18 having a free end, which portions are connected together by a slanting intermediate portion 20. The sealing portion 18 preferably bears with slight radial, mechanical pre-stressing against an inner circumferential surface of a cylinder. The intermediate portion 20 together with the inside of the annular groove 12 forms a first pressurized-support chamber 22 and a second pressurized-support chamber 24, which each have an approximately V-shaped cross sectional geometry.

As is indicated by the two flow arrows 26 and 28, to support the sealing effect of the sealing ring the two pressurized-support chambers 22, 24 14 are pneumatically or hydraulically connected to the two cylinder chambers 30, 32 separated by the piston 10. This allows a fluid, such as compressed air, for example, contained in the two cylinder chambers 30, 32 to pass into the two pressurized-support chambers 22, 24, each assigned to a cylinder chamber 30, 32. The ducts necessary for the free, unimpeded passage of the fluid are created on the sealing ring 14 by integral molded-on strips 34, 36 or projections, which, for this purpose, have multiple, radially oriented openings or cutouts, and which each come to rest with a light contact pressure on opposing, parallel inside faces of the annular groove 12.

A disadvantage with this known construction, as indicated by the flow arrows 26, 28, is that the fluid is only able to flow from the cylinder chambers 30, 32 into the two pressurized-support chambers 22, 24 radially from outside, so that, even in the event of a slight axial deformation of the sealing ring 14, the passages to the pressurized-support chambers 22, 24, kept open by the two strips 34, 36, are at least partially closed, and the pressurized-support of the sealing ring 14 by the pressurized fluid is no longer fully assured. The further technical details of the sealing ring 14 can be gleaned from DE 296 10 628 U1, for example, which is incorporated herein by reference.

Figure 2:
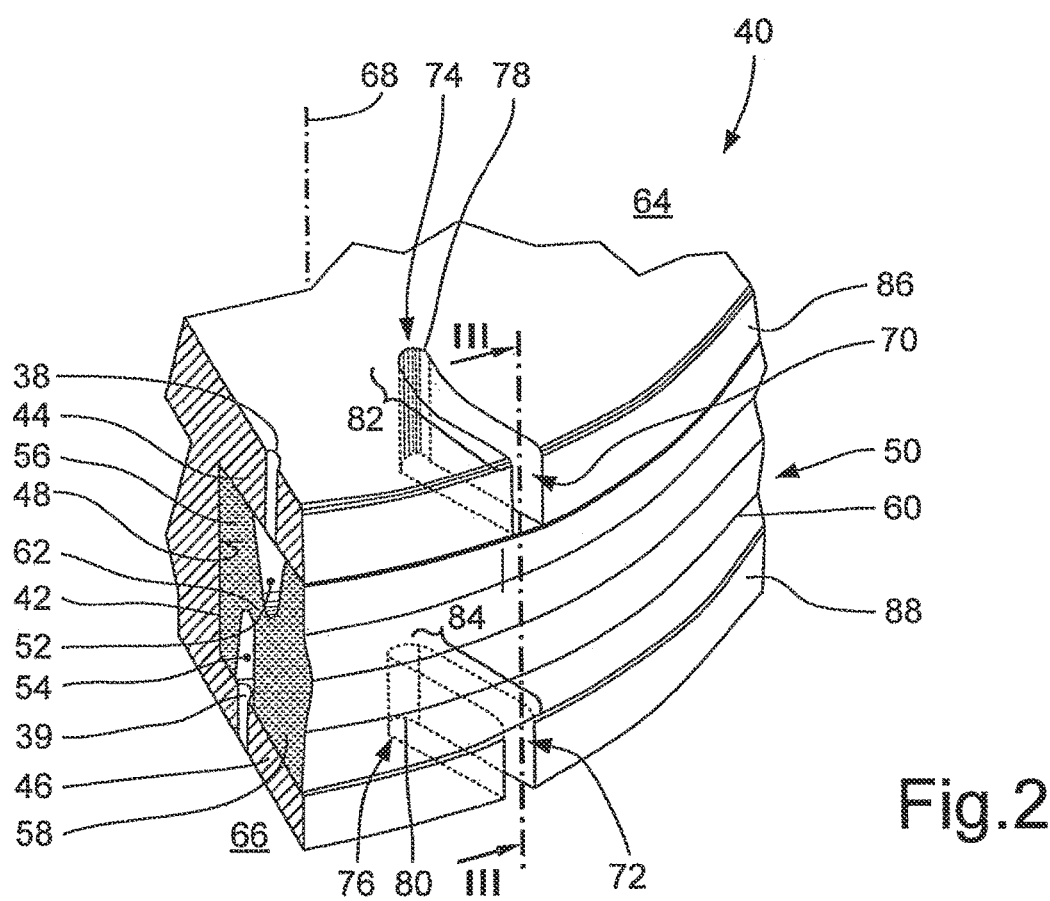
FIG. 2 shows a diagrammatic and perspective partial view of a piston according to an embodiment of the present invention.

FIG. 2 shows a simplified perspective partial view of a piston 40 designed according to an embodiment of the present invention. The cylindrical piston 40 has a peripheral, circumferential annular groove 42 having a first and a second groove wall 44, 46, which run parallel and at an axial interval from one another, and a groove base 48 connecting the two groove walls 44, 46. The piston 40 can be used as a relay valve in which compressed air is used as fluid.

The two parallel groove walls 44, 46 and the groove base 48 together with a groove aperture form a rectangular cross sectional geometry. A sealing ring 50, which in this exemplary embodiment together with the two groove walls 44, 46 define a first pressurized-support chamber 52 and a second pressurized-support chamber 54, is seated with a light contact pressure in the annular groove 42. The sealing ring 50 further comprises a radially inner retaining portion 56 for secure locating inside the annular groove 42, and a sealing portion 58 facing radially outwards and having a seal projection 60, the two pressurized-support chambers 52, 54 of approximately V-shaped cross section being formed more or less opposite on a slanting intermediate portion 62 of the sealing ring 50. The piston 40 axially separates a first cylinder chamber 64 and a second cylinder chamber 66 from one another, the chambers each being filled with a suitable fluid, such as compressed air, for example, an alternative gas mixture or a liquid.

According to an embodiment of the present invention, at least one slit-shaped, cutout facing radially inwards in the direction of a longitudinal center axis 68 of the piston 40 is, in each case, made as a through-aperture in the first groove wall 44 and in the second groove wall 46, of which cutouts two standing for all further unrepresented cutouts or apertures bear the reference numerals 70, 72 and have an approximately cuboid geometry.

At least three cutouts 70, arranged axially above one another and spaced at uniform intervals from one another over the circumference of the piston 40, are preferably provided in each of the two groove walls 44, 46, in order to achieve the most efficient connection possible, in terms of fluid dynamics, of the two cylinder chambers 64, 66 with the two pressurized-support chambers 52, 54 respectively assigned to them. The cutouts 70, 72 pass axially through the groove walls 44, 46 and perpendicularly to the latter or parallel to the longitudinal center axis 68, in order to allow fluid to pass with the lowest possible flow resistance. The cutout 70 in the upper groove wall 44 extends radially inwards up to the groove base 48 of the annular groove 42.

The fluid from the opposing cylinder chambers 64, 66 separated by the piston 40 passes through the two cutouts 70, 72 with virtually no resistance into the pressurized-support chambers 52, 54 intended to optimize the sealing effect on the sealing ring 50. The sealing effect of the piston 40 is substantially supported by a slight radial expansion of the sealing ring 50 due to the pressurized fluid flowing into the pressurized-support chambers 52, 54 on both sides. As a result, the seal projection 60 is brought to bear firmly with a radial force against an inner circumferential surface 92 of a cylinder 92 coaxially enclosing the piston 40 (cf. FIG. 3).

In order to reduce the tendency to cracking inside the piston 40 due to notch stresses, end portions 74, 76 of the cutouts 70, 72, facing radially inwards in the direction of the longitudinal center axis 68, each have a rounding 78, 80 with a suitable radius of curvature.

The radial length 82, 84 of each of the cutouts 70, 72, starting from outer edges 86, 88 of the first and the second groove wall 44, 46, is designed so that ideally the cutouts 70, 72 completely cover the pressurized-support chambers 52, 54 radially, in order to obtain the freest possible fluid pressure equalization between the pressurized-support chambers 52, 54 and the cylinder chambers 64, 66. Since the geometry and/or the fitting direction of an Airzet sealing ring or a similar sealing ring is not fi prescribed, the length of the slit-shaped cutouts 70, 72 may be equal or unequal to one another. In order to cater for different sealing ring variants and fitting variants, the slit-shaped cutouts 70, 72 nevertheless preferably extend radially up to the groove base 48.

Apart from the strips to form a cavity for the passage of fluid, the sealing ring 50 may be formed substantially according to the bilaterally pressurized-support sealing ring discussed above in detail in connection with FIG. 1, ("Airzet" sealing ring). It should be appreciated that other pressurized-support sealing elements having a modified geometrical design may also be used.

As FIG. 2 shows in the area of the left-hand sectional face, in addition to or instead of the slit-shaped cutouts 70, 72, multiple bores 38, 39, axially parallel to the longitudinal center axis 68, may be introduced into the two groove walls 44, 46 as apertures. These bores 38, 39 are likewise introduced into the groove walls 44, 46 in the area of the pressurized-support chambers 52, 54 and pass axially right through these groove walls 44, 46, in order to allow the freest possible passage of the fluid.

Figure 3:
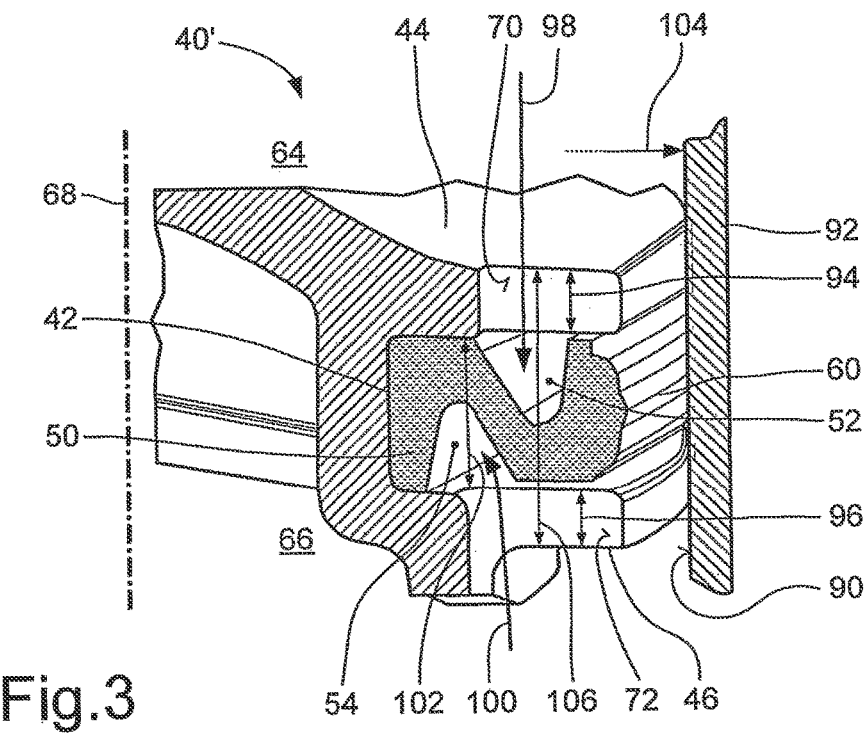
FIG. 3 shows a partial cross section through a piston according to FIG. 2.

FIG. 3 shows a diagrammatic partial cross section through a piston 40', as is also represented in FIG. 2. The sealing ring 50 is again seated in the annular groove 42 and by means of its seal projection 60 seals the piston. 40' against the inner circumferential surface 90 of the cylinder 92. Both the piston 40' and the cylinder 92 are arranged coaxially with the longitudinal center axis 68. A first slit-shaped cutout 70 is formed in the first groove will 44, while a second cutout 72 is made in the second groove wall 46, axially below the former. The first cutout 70 extends axially over the full material thickness 94 of the first groove wall 44, and the second cutout 72 extends over the full material thickness 96 of the second groove wall 46. A fluid contained in the first cylinder chamber 64 passes through the first cutout 70 in the first groove wall 44 into the first pressurized-support chamber 52, according to the first flow arrow 98, while the fluid from the second cylinder chamber 66 is able to flow largely unimpeded through the second cutout 72 situated in the second groove wall 46 into the second pressurized-support chamber 54, in the direction according to the second flow arrow 100.

The material thickness 94, 96 of both groove walls 44, 46 is, in each case, preferably less than or equal to the groove depth 102 of the annular groove 42. In addition, the piston diameter 104 in the area the annular groove 42 is preferably greater than a piston height 106 in the area.

Figure 4:
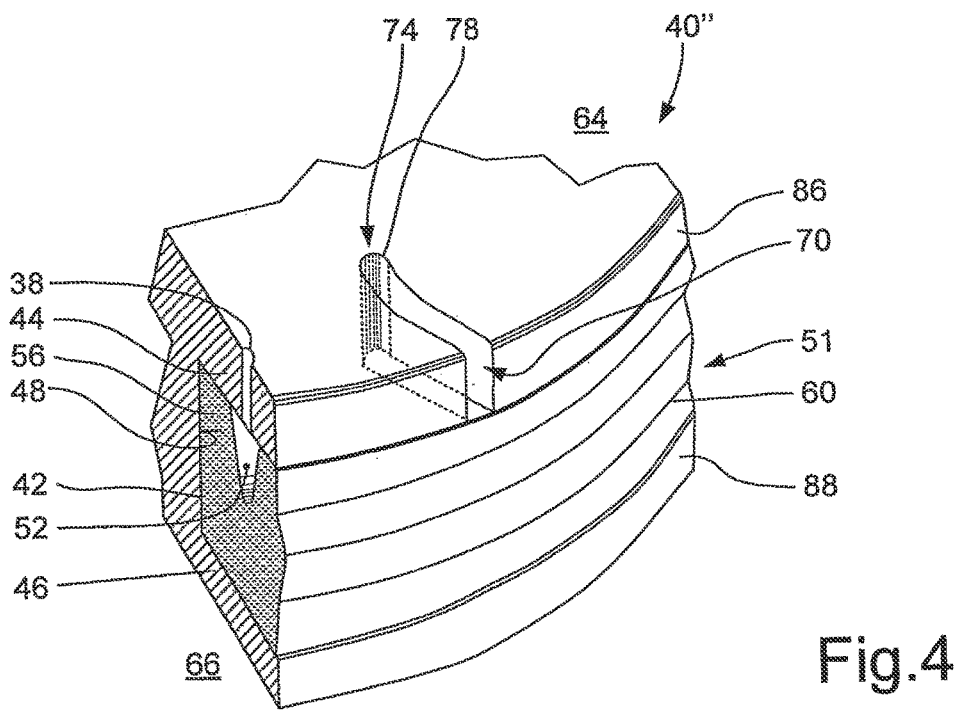
FIG. 4 shows a piston as in FIG. 2, but having a sealing ring that forms only one pressurized-support chamber.

As FIG. 4 shows, a sealing ring 51, which together with a groove wall 44 of the annular groove 42 forms just one pressurized-support chamber 52, can be inserted into the annular groove 42 of the piston 40". In this case, it suffices if the fluid pressure passing through the slit-shaped cutout 70 in the first groove wall 44 into the single pressurized-support chamber 52 presses the upper sealing ring portion, rendered thinner and hence more flexible by this cutout 70, with an additional force radially against the inner circumferential surface 90 of the cylinder 92.

Figure 5:
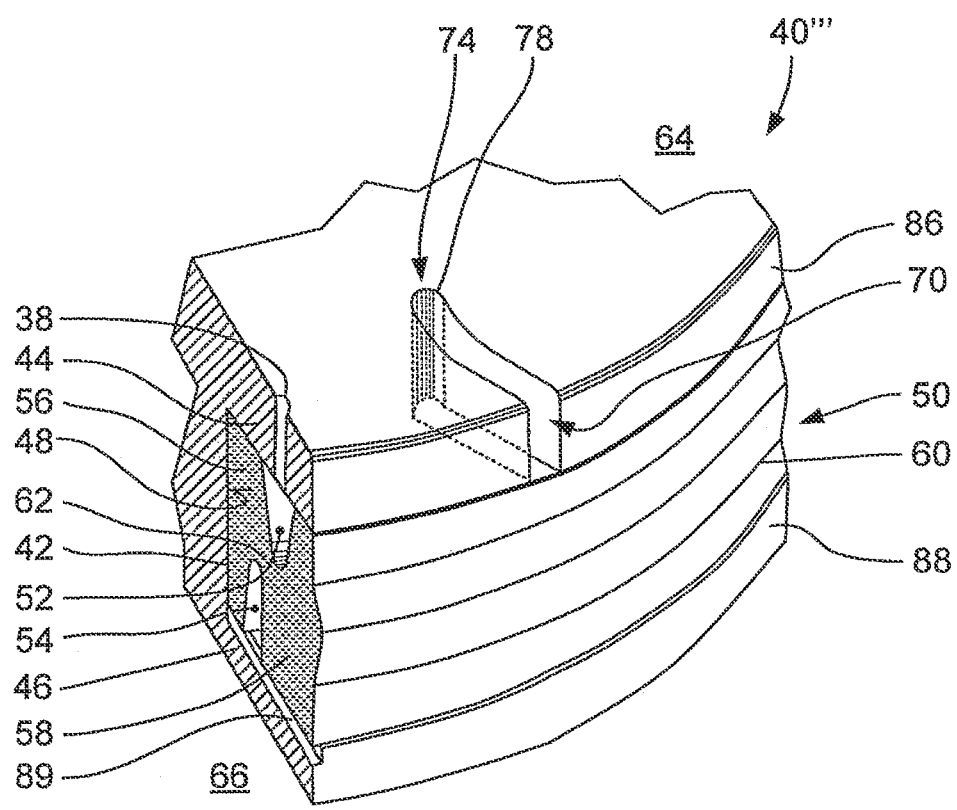
FIG. 5 shows a piston as in FIG. 2, in which a radial channel is formed on the lower annular groove wall.

In the exemplary embodiment shown in FIG. 5, two pressurized-support chambers 52, 54 are formed by the sealing ring 50 and the groove walls 44, 46 of the annular groove 42 of the piston 40'''. The first, upper pressurized-support chamber 52 is connected to the first, upper pressure chamber 64 via at least one slit-shaped cutout 70, while the second, lower pressurized-support chamber 54 has a fluid connection to the second, lower pressure chamber 66 via a radial channel 89, which is formed on the side of the second, lower groove wall 46 close to the sealing ring. Such radial channels 89 may also additionally be arranged on the respective groove walls 44, 46 provided with the axial apertures 38, 39, 70, 72, in order to assist the ventilation of at least one pressurized-support chamber 52, 54.

The slit-shaped cutouts 70, 72, made in at least one of the two groove walls 44, 46, each allow a straightforward fluid pressure equalization between the two cylinder chambers 64, 66 and the two pressurized-support chambers 52, 54, even if operation gives rise to a geometrical deformation of the sealing ring 50, for example. An optimum sealing effect between the cylinder chambers 64, 66 can thereby be achieved under all service conditions of the piston 40, 40', 40", 40'''. The piston 40, 40', 40", 40''' may be a pneumatically operated relay piston of a pneumatic system, for example.

Figure 6:
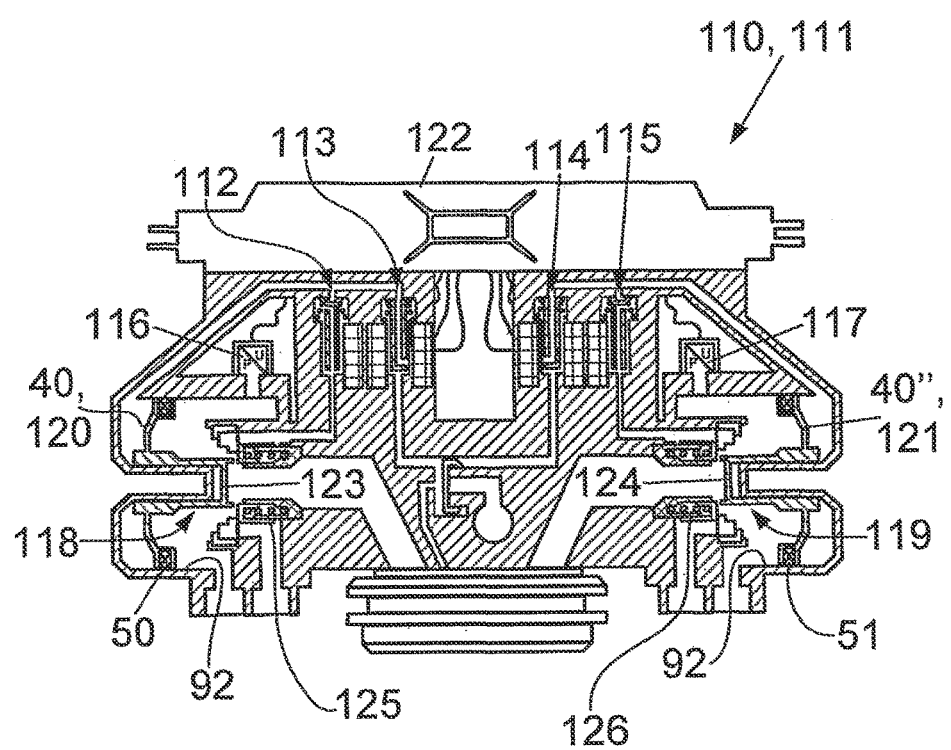
FIG. 6 is a diagrammatic, sectional representation of a control valve having a piston according to an exemplary embodiment of the present invention.

FIG. 6 is a diagrammatic sectional representation of an exemplary embodiment of a control valve 110 of a compressed air system of a vehicle in which the piston 40, or the piston 40', 40" or 40''' is fitted. The control valve 110 is an axle modulator 111 of an electronically controlled braking system (EBS) of a commercial vehicle having a pneumatically operated braking system. The construction of the axle modulator 111 is known in the art; an axle modulator having the basic construction represented in FIG. 6 has been commercially available from the applicant since at least 2004 as "$2^{nd}$ generation EBS axle modulator" under part number 480 104 104 0.

The axle modulator 111 regulates the brake cylinder pressure on both sides of one or two axles of the commercial vehicle. It comprises two pneumatically independent pressure control circuits each having two solenoid valves 112-115, a brake pressure sensor 116, 117 and a relay valve 118, 119, and having common control electronics (ECU) 120. The axle modulator 111 uses rotational speed sensors to register the wheel speeds, evaluates these and relays them to a central module of the vehicle, which then determines the desired pressures. The axle modulator 111 independently undertakes anti-lock brake controls (ABS). If wheels of the vehicle show a tendency to lock or spin, the axle modulator 111 adjusts the desired pressure setting.

The relay valves 118, 119 each comprise one of the pistons 40, 40', 40" or 40''' previously described as control piston 120, 121; in the exemplary embodiment represented, the relay valve 118 arranged on the left-hand side of the figure comprises the piston 40 having a sealing ring 50 according to FIG. 2 as control piston 120, while the relay valve 119 on the right-hand side of the figure comprises the piston 40" having a sealing ring 51 according to FIG. 4 as control piston 121. It is also possible, however, to use pistons of identical design, that is, for example, two pistons 40 each having sealing rings 50.

The pistons 40, 40" of the relay valves 118, 119 each bear on the cylinder 92 with their sealing rings 50, 51. The pistons 40, 40" each have a piston head 123, 124, each of which actuates an assigned plate valve 125, 126.

The possible uses of the pistons 40, 40', 40" and 40''' are not limited to an axle modulator 111, even if the pistons 40, 40', 40" and 40''' are preferably used in an axle modulator 111 of the type shown in FIG. 6, or in another axle modulator, for example in a third-generation axle modulator (for example WABCO unit number 480 105 001 0). Thus, it is feasible to use the pistons 40, 40', 40" and 40''' in control valves of similar construction in vehicle compressed-air systems, particularly in control valves having at least one relay valve, for example in pilot-operated control valves of air drier systems, in relay valves of automobile air suspension systems, in proportional relay valves, in redundancy valves, in brake power sensors, in footbrake valves, trailer modulators, or in trailer control valves. It is likewise feasible to provide a single-Channel axle modulator having just one relay valve, as is available from the applicant under part number 480 106 511 0, with a relay valve having a control piston, which comprises a piston 40, 40', 40", 40''' of the design type previously described.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air system of a vehicle, comprising:
   a control valve comprising a relay valve, the relay valve comprising:
      a cylinder including an inner circumferential surface, and
      a piston that is insertable into the cylinder and axially displaceable along a longitudinal center axis of the cylinder to separate a first chamber of the cylinder and a second chamber of the cylinder from one another, the piston comprising:
         a circumferential annular groove having an approximately rectangular cross sectional geometry and including a groove base, a first groove wall that extends in a radial direction outward from the groove base, and a second groove wall that extends in the radial direction outward from the groove base,
         a sealing ring that is insertable into the circumferential annular groove, and
         at least one first slit-shaped cutout extending in the radial direction and having an approximately rectangular cross sectional geometry in an area of the annular groove,
   wherein the sealing ring and the first groove wall of the annular groove solely define a first pressurized-support chamber,
   wherein, around an entire first circumference of the circumferential annular groove, the sealing ring extends from the first groove wall to the second groove wall, the first circumference being located in the radial direction outward from the first pressurized-support chamber,
   wherein the at least one first slit-shaped cutout connects the first pressurized-support chamber to the first chamber of the cylinder, and
   wherein a radial inner end portion of the at least one first slit-shaped cutout has a rounding about an axis that runs parallel to the longitudinal center axis of the cylinder.

2. The compressed air system as claimed in claim 1, wherein the sealing ring and the second groove wall of the annular groove define a second pressurized-support chamber, and
   wherein the piston further comprises at least one second slit-shaped cutout extending in the radial direction and having an approximately rectangular cross sectional geometry that connects the second pressurized-support chamber to the second chamber of the cylinder.

3. The compressed air system as claimed in claim 2, wherein the at least one first slit-shaped cutout comprises at least three first slit-shaped cutouts,
   wherein the at least one second slit-shaped cutout comprises at least three second slit-shaped cutouts,
   wherein the at least three first slit-shaped cutouts are disposed at uniform intervals in the first groove wall, and
   wherein each of the at least three second slit-shaped cutouts are disposed at uniform intervals in the second groove wall.

4. The compressed air system as claimed in claim 2, wherein the at least one first slit-shaped cutout and the at least one second slit-shaped cutout are disposed circumferentially and radially one above the other in a direction parallel to the longitudinal center axis of the cylinder.

5. The compressed air system as claimed in claim 2, wherein at least one radial channel formed in at least one of the first or the second groove wall on a sealing ring side connects at least one of the first or the second pressurized-support chamber to at least one of the first or the second chamber of the cylinder.

6. The compressed air system as claimed in claim 1, wherein each of the at least one first slit-shaped cutouts is disposed in the first groove wall and extends inwardly in the radial direction from a radial outer edge of the piston at least into an area of the first pressurized-support chamber.

7. The compressed air system as claimed in claim 1, wherein each of the at least one second slit-shaped cutouts is disposed in the second groove wall and extends inwardly in the radial direction from a radial outer edge of the piston at least into an area of the second pressurized-support chamber.

8. The compressed air system as claimed in claim 1, wherein each of the at least one first slit-shaped cutout and each of the at least one second slit-shaped cutout has a base at a radial inner end,
   wherein the base at the radial inner end of each of the at least one first slit-shaped cutout and at each of the at least one second slit-shaped cutout is disposed in a radially outward direction relative to the groove base of the circumferentially annular groove.

9. The compressed air system as claimed in claim 1, wherein the control valve is an axle modulator.

10. The compressed air system as claimed in claim 1, wherein the control valve further comprises a second relay valve, the second relay valve comprising:
- a second cylinder including a second inner circumferential surface, and
- a second piston that is insertable into the cylinder and axially displaceable along a longitudinal center axis of the cylinder to separate a first chamber of the second cylinder and a second chamber of the second cylinder from one another, the second piston comprising:
  - a second circumferential annular groove having an approximately rectangular cross sectional geometry,
  - a second sealing ring that is insertable into the second circumferential annular groove, and
  - an axial aperture in an area of the second circumferential annular groove,
- wherein the second sealing ring and at least one wall of the second annular groove define a pressurized-support chamber of the second piston; and
- wherein the axial aperture connects the pressurized-support chamber of the second piston to the first chamber of the second cylinder.

11. A compressed air system of a vehicle, comprising:
- a control valve comprising a relay valve, the relay valve comprising:
  - a cylinder including an inner circumferential surface, and
  - a piston that is insertable into the cylinder and axially displaceable along a longitudinal center axis of the cylinder to separate a first chamber of the cylinder and a second chamber of the cylinder from one another, the piston comprising:
    - a circumferential annular groove having an approximately rectangular cross sectional geometry and including a groove base, a first groove wall that extends in a radial direction outward from the groove base, and a second groove wall that extends in the radial direction outward from the groove base,
    - a sealing ring that is insertable into the circumferential annular groove, and
    - at least one first axial aperture in an area of the annular groove,
  - wherein the sealing ring and the first groove wall of the annular groove solely define a first pressurized-support chamber,
  - wherein the at least one first axial aperture connects the first pressurized-support chamber to the first chamber of the cylinder, and
  - wherein, around an entire first circumference of the circumferential annular groove, the sealing ring extends from the first groove wall to the second groove wall, the first circumference being located in the radial direction outward from the first pressurized-support chamber.

12. The compressed air system as claimed in claim 11, wherein the sealing ring and the second groove wall of the annular groove define a second pressurized-support chamber, and
- wherein at least one second axial aperture connects the second pressurized-support chamber to the second chamber of the cylinder.

13. The compressed air system as claimed in claim 12, wherein the at least one first axial aperture comprises at least three first axial apertures,
- wherein the at least one second axial aperture comprises at least three second axial apertures,
- wherein the at least three first axial apertures are disposed at uniform intervals in the first groove wall, and
- wherein each of the at least three second axial apertures are disposed at uniform intervals in the second groove wall.

14. The compressed air system as claimed in claim 12, wherein the at least one first axial aperture and the at least one second axial aperture are disposed circumferentially and radially one above the other in a direction parallel to the longitudinal center axis of the cylinder.

15. The compressed air system as claimed in claim 12, wherein each of the at least one first axial aperture and the at least one second axial aperture is a slit-shaped cutout extending in a radial direction relative to the longitudinal center axis of the cylinder and having an approximately rectangular cross sectional geometry.

16. The compressed air system as claimed in claim 12, wherein each of the at least one first axial aperture is a slit-shaped cutout in the first groove wall extending inwardly in the radial direction from a radial outer edge of the piston at least into an area of the first pressurized-support chamber.

17. The compressed air system as claimed in claim 12, wherein each of the at least one second axial aperture is a slit-shaped cutout in the second groove wall extending inwardly in the radial direction from a radial outer edge of the piston at least into an area of the second pressurized-support chamber.

18. The compressed air system as claimed in claim 12, wherein each of the at least one first axial aperture and each of the at least one second axial aperture has an aperture groove base at a radial inner end,
- wherein the aperture groove base at the radial inner end of each of the at least one first axial aperture and at each of the at least one second axial aperture is disposed in a radially outward direction relative to the groove base of the circumferentially annular groove.

19. The compressed air system as claimed in claim 12, wherein the radial inner end of each of the at least one first axial aperture and each of the at least one second axial aperture has a rounding.

20. The compressed air system as claimed in claim 11, wherein each of the at least one first axial aperture is a straight bore in a radial area of the at least one first pressurized-support chamber, wherein the straight bore is perpendicular to normal to a surface of the first groove wall.

21. A compressed air system of a vehicle, comprising:
- a control valve comprising a relay valve, the relay valve comprising:
  - a cylinder including an inner circumferential surface, and
  - a piston that is insertable into the cylinder and axially displaceable along a longitudinal center axis of the cylinder to separate a first chamber of the cylinder and a second chamber of the cylinder from one another, the piston comprising:
    - a circumferential annular groove having an approximately rectangular cross sectional geometry and including a groove base, a first groove wall that extends in a radial direction outward from the groove base, and a second groove wall that extends in a radial direction outward from the groove base,
    - a sealing ring that is insertable into the circumferential annular groove, and
    - at least one first axial aperture in an area of the annular groove, wherein the sealing ring and the first groove wall of the annular groove define a first pressurized-support chamber, and wherein the at least one first axial aperture connects the first pressurized-support chamber to the first chamber of the cylinder, wherein, around an entire first circumference of the circumferential annular groove, the sealing ring extends from the first groove wall to the second groove wall, the first circumference being located in the radial direction outward from the first pressurized-support chamber, wherein the sealing ring and the second groove wall of the annular groove define a second pressurized-support chamber, and wherein at least one second axial aperture connects the second pressurized-support chamber to the second chamber of the cylinder.

* * * * *